Nov. 6, 1923.
L. R. ZEPKA
1,473,272
THEFT SIGNAL
Filed March 23, 1922    2 Sheets-Sheet 2
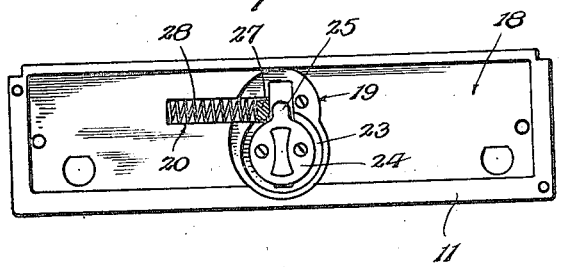
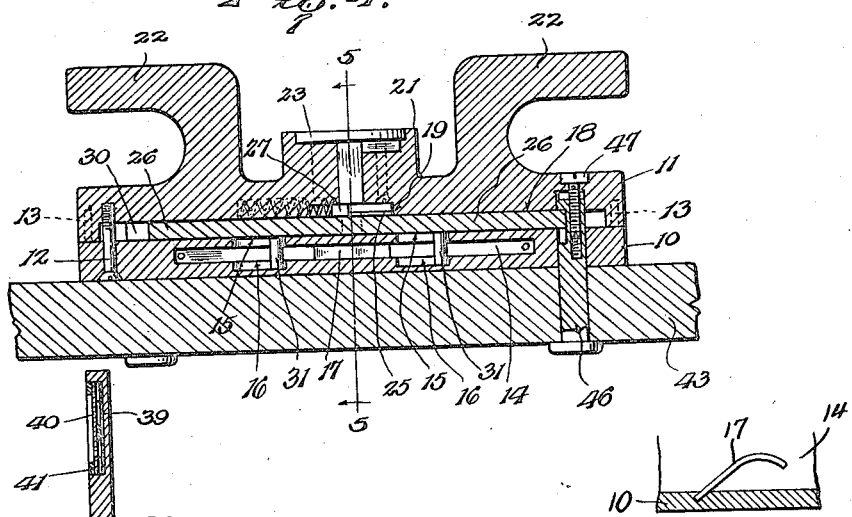
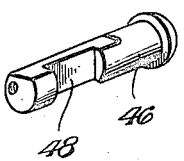
Inventor
L. R. Zepka.
By
Lacey & Lacey, Attorneys Patented Nov. 6, 1923.

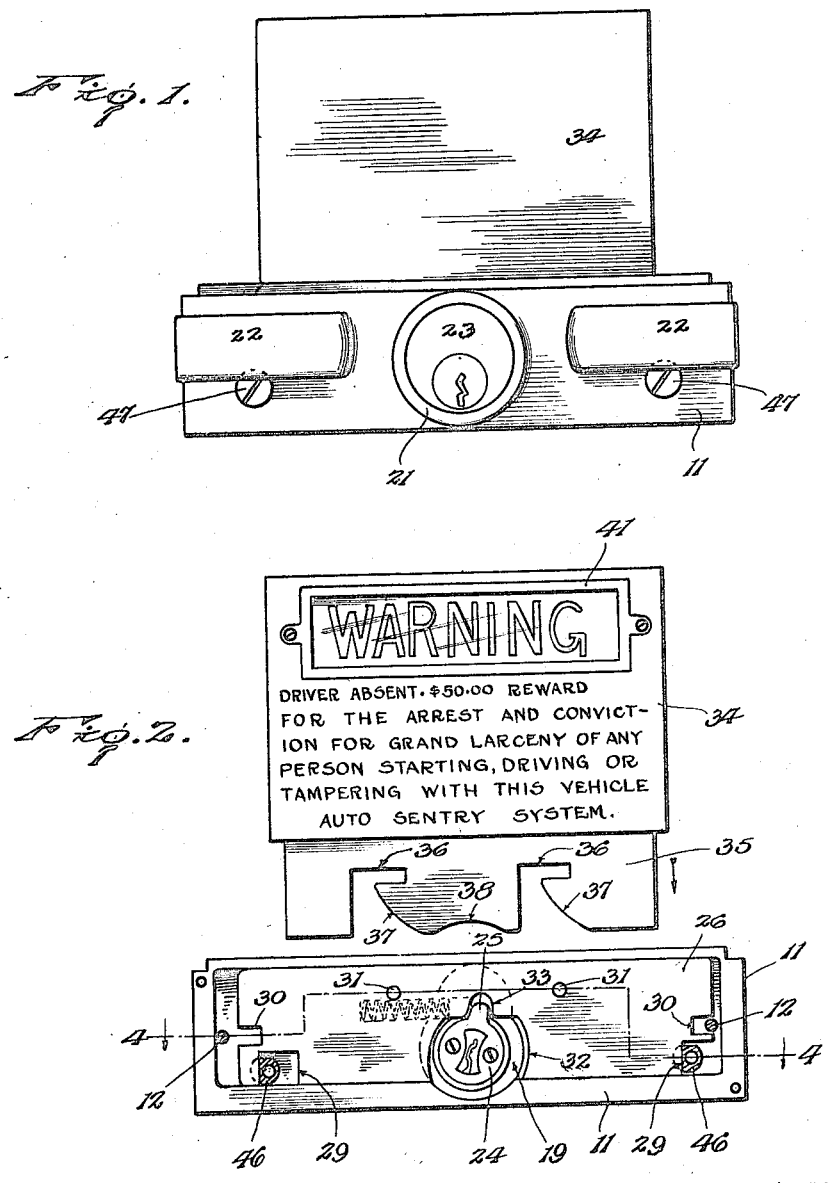

1,473,272

UNITED STATES PATENT OFFICE.

LUDWIG R. ZEPKA, OF CLEVELAND, OHIO.

THEFT SIGNAL.

Application filed March 23, 1922. Serial No. 546,151.

*To all whom it may concern:*

Be it known that I, LUDWIG R. ZEPKA, citizen of the United States, residing at Cleveland, in the county of Cuyahoga and State of Ohio, have invented certain new and useful Improvements in Theft Signals, of which the following is a specification.

This invention relates to an improved theft signal for motor vehicles and seeks, as one of its principal objects, to provide a device which may be readily attached to a vehicle wind shield and embodying a signal plate which may be displayed when the owner or other authorized operator of the vehicle is absent.

The invention has as a further object to provide a signal wherein the signal plate may be locked against removal and wherein the locking means employed for said plate will also serve to lock the device upon the wind shield.

And the invention has as a still further object to provide a device which will be neat and attractive in appearance, which will be compact, and which, in practical use, will operate with entire dependability.

Other and incidental objects will appear hereinafter.

In the drawings:

Figure 1 is a rear elevation of my improved device,

Figure 2 is a vertical sectional view, the signal plate being detached,

Figure 3 is an elevation of one of the sections of the base of the device,

Figure 4 is a horizontal sectional view on the line 4—4 of Figure 2, looking in the direction of the arrows, Figure 5 is a vertical sectional view on the line 5—5 of Figure 4, looking in the direction of the arrows, and Figure 6 is a detail perspective view of one of the attaching pins employed.

Figure 7 is a fragmentary sectional view particularly showing the signal plate ejecting spring of the device.

In carrying the invention into effect, I employ an oblong base including mating sections 10 and 11 detachably secured together by screws 12. Preferably, one of the sections is, as shown in Figure 4, provided with centering studs 13 which are engageable in suitable sockets in the other of said sections to facilitate the assembling of the sections. Formed in the section 10 is a vertical slot 14 and entering through the inner side wall of said slot are horizontal slots 15 opposite which the outer side wall of the slot 14 is provided with recesses 16. Secured at one end in the bottom wall of the slot 14 medially thereof, is a longitudinally bowed spring 17.

Formed in the section 11 of the base at its inner side is a longitudinally extending recess 18 in the bottom wall of which is formed a chamber 19 from which leads, as particularly shown in Figure 3, a laterally directed slot 20. Opposite the chamber 19, the section is provided at its outer side with a boss 21 and projecting from the section at opposite sides of said boss are oppositely directed handles 22. Mounted in said boss is an appropriate lock 23, the cylinder of which projects into the chamber 19 and detachably mounted upon said cylinder at its inner end is a plate 24 having a radial lug 25 accommodated in said chamber. Slidably mounted in the recess 18 is a catch plate 26 confined between the sections 10 and 11 of the base and projecting rearwardly from said plate for movement in the slot 20 is a lug 27. Fitting in the slot to engage said lug is a spring 28 normally projecting the catch plate to active position. As best shown in Figure 2, the plate is provided at its lower edge with notches 29 and at its ends with other notches 30. These latter notches are disposed to receive the screws 12 so that the plate may freely move endwise and projecting from the plate at its forward side are spaced pins 31 which project freely through the slots 15 of the section 10 and are loosely received at their ends in the recesses 16, the pins crossing the slot 14. Formed in the plate at its lower margin to accommodate the plate 24 upon the lock cylinder is an elongated opening 32 at the upper side of which is a notch 33 freely receiving the lug 25 of the latter plate so that, as will be at once appreciated, a proper key may be inserted in the lock 23 and the lock cylinder rotated for moving the catch plate 26 endwise against the tension of the spring 28.

Detachably engageable with the base is a signal plate 34 reduced at its lower margin to provide a tongue 35 adapted to freely fit in the slot 14 of the base. This tongue is provided, as particularly shown in Figure 2, with substantially L-shaped slots 36, the corresponding side walls of which are cut away to form inclined edges or shoulders 37 leading into the slots while between the slots the lower edge of the tongue is recessed to provide a concave face 38. At its forward side, the signal plate bears a suitable inscription indicating that the owner or driver of the vehicle to which the device is attached, is absent, and that starting, driving or tampering with the vehicle is unauthorized. Above said inscription the plate is, as particularly shown in Figure 5, provided with a recess in which is removably fitted a card 39 bearing the word Warning, the letters of which are perferably luminous so that the word will be readily visible at night, and overlying the card is a transparency 40 of glass or celluloid. Fitting in the recess to overlie the margins of said transparency is a clamping frame 41 removably secured by screws or other suitable fastening devices so that, should it become necessary, the card may be renewed. This construction provides a very effective arrangement for mounting the card. However, if preferred, the signal word Warning may be imposed directly upon the signal plate, eliminating the card.

In use, the device is mounted upon the lower rail of the vehicle wind shield and in the drawing I have illustrated a conventional wind shield at 42, the lower rail of which is indicated at 43. As is well known, the lower rail of a wind shield is usually equipped at the inner side of the wind shield with a handle secured by appropriate fastening devices extending through said rail and in mounting the present device this handle is removed when the device is, as shown in Figure 5, seated against the rail of the wind shield. Since some wind shields are formed with flat rails, while others are formed with oval rails, the section 10 of the base of the device is provided at its upper and lower margins with flat faces 44 to seat against the rear face of a flat rail while between said flat faces, said section is formed with a concave face 45 to seat against the rear face of an oval rail, an oval rail being illustrated in the present instance. Fitting through the usual openings in the rail for the fastening devices of the customary handle, are headed attaching pins 46 extending into suitable openings in the base of the device across the slot 18. As shown in detail in Figure 6, these pins are formed with flat faces to coact with the base for locking the pins against rotation and countersunk in the section 11 of the base are screws 47 threaded into the inner ends of the pins for securing the pins against displacement and clamping the base against the rail of the wind shield. As shown in Figure 2, the pins are received through the notches 29 in the catch plate 26 and, as particularly brought out in detail in Figure 6, said pins are provided at corresponding sides thereof with notches or recesses 48 in which corresponding walls of the notches 29 of the catch plate seat in the normal projected position of the plate. Accordingly, the catch plate will normally lock the pins against retraction so that even should the screws 47 be removed, the device could not, nevertheless, be detached from the wind shield, the heads of the screws 12 being covered by the wind shield rail. As will be observed, the screws 47 are engaged with the pins 46 eccentrically thereof in order that the notches 48 may be made correspondingly deeper and, in this connection, it is to be noted that said notches are elongated to accommodate any variation in thickness of the bottom rails of different wind shields so that the screws 47 may, in every instance, be adjusted for tightly clamping the base against the wind shield rail.

As will now be understood in view of the preceding description, the device will be rigidly mounted at the rear of the vehicle wind shield so that the handles 22 upon the base of the device may be grasped for tilting the wind shield in the customary manner, the device thus supplanting the usual handle of the wind shield. Upon leaving the vehicle, the tongue 35 of the signal plate 34 is inserted in the slot 14 of the base, when, as will be observed, the inclined edges of the slots 36 will contact with the pins 31 of the catch plate 26. Accordingly, downward pressure may then be exerted upon the signal plate for shifting the catch plate endwise against the tension of the spring 28 and seating the tongue 35 of the signal plate in said slot, when the catch plate will be returned to its normal position to engage the pins 31 in the laterally directed portions of the slots in the tongue. Thus, the signal plate will be locked upon the base to upstand therefrom at the rear of the wind shield so that the warning upon said plate will be readily visible. Upon the return of the driver to the vehicle, the key is inserted in the lock 23 and the lock operated, as previously described, for retracting the catch plate, when the signal plate may be lifted upwardly and removed. As the tongue 35 of the signal plate is inserted in the slot 14, the concave face 38 at the lower edge of the tongue engages the spring 17 at the bottom of said slot so that downward movement of the signal plate serves to tension the spring. Accordingly, when the lock 23 is operated to retract the catch plate and free the signal plate, the spring will immediately act to throw the signal plate upwardly and partially eject the tongue of the plate from said slot so that when the key of the lock is released, the catch plate cannot return to engage the pins thereof with the signal plate. Thus, the signal plate can be removed without the necessity for the use of both hands. It will, therefore, be seen that I provide a particularly effective device for the purpose set forth and a device which cannot be displaced without injuring the vehicle wind shield nor can the device be operated except by an authorized person who holds the key to the lock of the device.

Having thus described the invention, what is claimed as new is:

1. A theft signal including a base, a signal plate insertable therein, means upon the base for automatically locking the plate when inserted in the base, and means secured at one end upon the base and free at its opposite end to engage the signal plate for ejecting the plate when released.

2. A theft signal including a base, a signal plate insertable therein, a slidable spring pressed catch plate housed by the base for automatically locking the signal plate when inserted in the base, the catch plate being provided with a notch, a lock upon the base having a cylinder, and a plate carried by said cylinder and provided with a lug engaging in said notch whereby the lock may be operated for retracting the catch plate and freeing the signal plate.

3. A theft signal including a base, a signal plate insertable therein, a spring pressed catch plate housed by the base for automatically locking the signal plate when inserted in the base, the catch plate being provided with an elongated opening having a notch extending therefrom, a lock upon the base having a cylinder, and a plate carried by said cylinder accommodated in the opening of the catch plate and provided with a lug engaging in said notch whereby the lock may be operated for retracting the catch plate and freeing the signal plate.

4. A theft signal including a base formed of mating sections, a signal plate insertable in the base, spring pressed means confined between the sections at the meeting faces thereof for automatically locking the said plate upon the base when inserted therein, and means for mounting the base normally locked in engagement therewith by said first mentioned means.

5. A theft signal including a base formed of mating sections one provided at its inner side with a recess, a signal plate insertable in the base, a spring pressed catch plate slidable in said recess for automatically locking the signal plate upon the base when inserted therein, and means for mounting the base normally locked in engagement therewith by said catch plate.

6. A theft signal including a base having a slot therein, a signal plate insertable in the base, a slidable catch plate housed within the base and provided at one side with a laterally directed lug freely received in said slot, and a spring lying in the slot covered by the catch plate to bear against said lug for urging the catch plate to engage the signal plate when inserted in the base.

7. A theft signal including a base formed of mating sections one provided at its inner side with a recess having a slot in the bottom wall thereof, a signal plate insertable in the base, a catch plate slidable in said recess and provided at one side with a laterally directed lug projecting into said slot, and a spring lying within the slot covered by the catch plate and engaging said lug for urging the catch plate to engage the signal plate when inserted in the base.

8. A theft signal including a base, attaching means extending into the base, adjustable means coacting between the base and said first mentioned means for clamping the base to a support engaged by said first mentioned means, locking means upon the base normally engaging said first mentioned means securing said first mentioned means against displacement, and signaling means normally carried by the base for display.

9. A theft signal including a base, attaching pins extending into the base, screws threaded into the pins and adjustable for clamping the base to a support engaged by the pins, a spring pressed catch plate upon the base normally engaging the pins securing said pins against displacement, and signaling means normally carried by the base for display.

In testimony whereof I affix my signature.

LUDWIG R. ZEPKA. [L. S.]